US006748521B1

United States Patent
Hoyle

(10) Patent No.: US 6,748,521 B1
(45) Date of Patent: Jun. 8, 2004

(54) MICROPROCESSOR WITH INSTRUCTION FOR SATURATING AND PACKING DATA

(75) Inventor: David Hoyle, Glendale, AZ (US)

(73) Assignee: Texas Instruments Incorporated, Dallas, TX (US)

( * ) Notice: Subject to any disclaimer, the term of this patent is extended or adjusted under 35 U.S.C. 154(b) by 603 days.

(21) Appl. No.: 09/702,476

(22) Filed: Oct. 31, 2000

Related U.S. Application Data

(60) Provisional application No. 60/183,527, filed on Feb. 18, 2000.

(51) Int. Cl.[7] .......................... G06F 9/302; G06F 9/305; G06F 9/38
(52) U.S. Cl. .......................... 712/221; 712/35; 712/36; 712/222; 712/223; 712/224; 712/219; 712/207; 712/213; 708/521; 708/508
(58) Field of Search .................. 712/221, 223, 712/214, 219, 213, 35, 36, 222, 207, 224; 708/210, 204, 498, 508, 510, 521; 711/214

(56) References Cited

U.S. PATENT DOCUMENTS 5,765,216 A * 6/1998 Weng et al. ............... 711/214
5,974,540 A * 10/1999 Morikawa et al. ........... 712/221
6,529,922 B1 * 3/2003 Hoge .......................... 708/204

* cited by examiner

*Primary Examiner*—Daniel H. Pan
(74) *Attorney, Agent, or Firm*—Robert D. Marshall, Jr.; W. James Brady, III; Frederick J. Telekcy, Jr.

(57) ABSTRACT

A data processing system is provided with a digital signal processor which has an instruction for saturating multiple fields of a selected set of source operands and storing the separate saturated results in a selected destination register. A first 32-bit operand (600) and a second 32-bit operand (602) are treated as four 16-bit fields and the sixteen bits in each field are saturated separately. Multi-field saturation circuitry is operable to treat a source operand as a number of fields, such that a multi-field saturated (610) result is produced that includes a number of saturated results each corresponding to each field. One instruction is provided which treats an operand pair as having two packed fields, and another instruction is provided that treats the operand pair has having four packed fields. Saturation circuitry is operable to selectively treat a field as either a signed value or an unsigned value. In another embodiment, an operand size different from 32-bits may be operated on, and the number of fields may be different than two or four.

11 Claims, 11 Drawing Sheets

OPERATIONS ON THE .L UNIT

| 31 29 | 28 27 | 23 22 | 18 17 | 13 12 | 11 5 4 3 2 1 0 |
|---|---|---|---|---|---|
| CREG | Z | DST | SCR2 | SRC1/CST | X | OP | 1 | 1 | 0 | S | P |
| 3 | | 5 | 5 | 5 | | 7 | | | | | |

FIG. 3A

OPERATIONS ON THE .M UNIT

| 31 29 | 28 27 | 23 22 | 18 17 | 13 12 | 11 7 6 5 4 3 2 1 0 |
|---|---|---|---|---|---|
| CREG | Z | DST | SCR2 | SRC1/CST | X | OP | 0 | 0 | 0 | 0 | S | P |
| 3 | | 5 | 5 | 5 | | 5 | | | | | | |

FIG. 3B

OPERATIONS ON THE .D UNIT

| 31 29 | 28 27 | 23 22 | 18 17 | 13 12 | 11 7 6 5 4 3 2 1 0 |
|---|---|---|---|---|---|
| CREG | Z | DST | SCR2 | SRC1/CST | OP | 1 | 0 | 0 | 0 | S | P |
| 3 | | 5 | 5 | 5 | 6 | | | | | | |

FIG. 3C

LOAD/STORE WITH 15-BIT OFFSET (ON THE .D UNIT)

| 31 29 | 28 27 | 23 22 | 8 7 6 4 3 2 1 0 |
|---|---|---|---|
| CREG | Z | DST/SRC | UCST15 | Y | LD/ST | 1 | 1 | S | P |
| 3 | | 5 | 15 | | 3 | | | | |

FIG. 3D

LOAD/STORE 'BASER' + 'OFFSETR/CST' ON THE .D UNIT

| 31 29 | 28 27 | 23 22 | 18 17 | 13 12 | 9 8 7 6 4 3 2 1 0 |
|---|---|---|---|---|---|
| CREG | Z | DST/SRC | BASE R | OFFSET R/UCST5 | MODE | R | Y | LD/ST | 0 | 1 | S | P |
| 3 | | 5 | 5 | 5 | 4 | | | 3 | | | | |

FIG. 3E

FIG. 3F OPERATIONS ON THE .S UNIT

| 31 29 28 | 27 23 22 | 18 17 | 13 12 11 | 6 5 | 2 1 0 |
|---|---|---|---|---|---|
| CREG | Z | DST | SRC2 | SRC1/CST | X | OP | 0 0 0 | S | P |
| 3 | | 5 | 5 | 5 | | 6 | | | |

FIG. 3G ADDK ON THE .S UNIT

| 31 29 28 | 27 23 22 | 7 6 5 | 2 1 0 |
|---|---|---|---|
| CREG | Z | DST | CST | 1 0 1 0 | S | P |
| 3 | | 5 | 16 | | | |

FIG. 3H BITFIELD OPERATIONS (IMMEDIATE FORMS) ON THE .S UNIT

| 31 29 28 | 27 23 22 | 18 17 | 13 12 | 8 7 6 5 | 2 1 0 |
|---|---|---|---|---|---|
| CREG | Z | DST | SRC2 | CSTA | CSTB | OP | 0 0 1 0 | S | P |
| 3 | | 5 | 5 | 5 | 5 | 2 | | | |

FIG. 3I MVK AND MVKH ON THE .S UNIT

| 31 29 28 | 27 23 22 | 7 6 5 4 | 2 1 0 |
|---|---|---|---|
| CREG | Z | DST | CST | H | 1 0 1 0 | S | P |
| 3 | | 5 | 16 | | | |

FIG. 3J BCOND DISP ON THE .S UNIT

| 31 29 28 | 27 | 7 6 5 | 2 1 0 |
|---|---|---|---|
| CREG | Z | CST | 0 0 1 0 | 0 | S | P |
| 3 | | 21 | | | |

MICROPROCESSOR WITH INSTRUCTION FOR SATURATING AND PACKING DATA

This application claims priority under 35 USC §119(e)(1) of Provisional Application No. 60/183,527, filed Feb. 18, 2000.

NOTICE (C) Copyright 2000 Texas Instruments Incorporated. A portion of the disclosure of this patent document contains material which is subject to copyright protection. The copyright owner has no objection to the facsimile reproduction by anyone of the patent disclosure, as it appears in the Patent and Trademark Office patent file or records, but otherwise reserves all copyright rights whatsoever.

TECHNICAL FIELD OF THE INVENTION

This invention relates to data processing devices, electronic processing and control systems and methods of their manufacture and operation, and particularly relates to microprocessors optimized for digital signal processing.

BACKGROUND OF THE INVENTION

Generally, a microprocessor is a circuit that combines the instruction-handling, arithmetic, and logical operations of a computer on a single semiconductor integrated circuit. Microprocessors can be grouped into two general classes, namely general-purpose microprocessors and special-purpose microprocessors. General-purpose microprocessors are designed to be programmable by the user to perform any of a wide range of tasks, and are therefore often used as the central processing unit (CPU) in equipment such as personal computers. Special-purpose microprocessors, in contrast, are designed to provide performance improvement for specific predetermined arithmetic and logical functions for which the user intends to use the microprocessor. By knowing the primary function of the microprocessor, the designer can structure the microprocessor architecture in such a manner that the performance of the specific function by the special-purpose microprocessor greatly exceeds the performance of the same function by a general-purpose microprocessor regardless of the program implemented by the user.

One such function that can be performed by a special-purpose microprocessor at a greatly improved rate is digital signal processing. Digital signal processing generally involves the representation, transmission, and manipulation of signals, using numerical techniques and a type of special-purpose microprocessor known as a digital signal processor (DSP). Digital signal processing typically requires the manipulation of large volumes of data, and a digital signal processor is optimized to efficiently perform the intensive computation and memory access operations associated with this data manipulation. For example, computations for performing Fast Fourier Transforms (FFTs) and for implementing digital filters consist to a large degree of repetitive operations such as multiply-and-add and multiple-bit-shift. DSPs can be specifically adapted for these repetitive functions, and provide a substantial performance improvement over general-purpose microprocessors in, for example, real-time applications such as image and speech processing.

DSPs are central to the operation of many of today's electronic products, such as high-speed modems, high-density disk drives, digital cellular phones, complex automotive systems, and video-conferencing equipment. DSPs will enable a wide variety of other digital systems in the future, such as video-phones, network processing, natural speech interfaces, and ultra-high speed modems. The demands placed upon DSPs in these and other applications continue to grow as consumers seek increased performance from their digital products, and as the convergence of the communications, computer and consumer industries creates completely new digital products.

Microprocessor designers have increasingly endeavored to exploit parallelism to improve performance. One parallel architecture that has found application in some modern microprocessors utilizes multiple instruction fetch packets and multiple instruction execution packets with multiple functional units.

Digital systems designed on a single integrated circuit are referred to as an application specific integrated circuit (ASIC). MegaModules are being used in the design of ASICs to create complex digital systems a single chip. (MegaModule is a trademark of Texas Instruments Incorporated.) Types of MegaModules include SRAMs, FIFOs, register files, RAMs, ROMs, universal asynchronous receiver-transmitters (UARTs), programmable logic arrays and other such logic circuits. MegaModules are usually defined as integrated circuit modules of at least 500 gates in complexity and having a complex ASIC macro function. These MegaModules are predesigned and stored in an ASIC design library. The MegaModules can then be selected by a designer and placed within a certain area on a new IC chip.

Designers have succeeded in increasing the performance of DSPs, and microprocessors in general, by increasing clock speeds, by removing data processing bottlenecks in circuit architecture, by incorporating multiple execution units on a single processor circuit, and by developing optimizing compilers that schedule operations to be executed by the processor in an efficient manner. Certain DSPs, for example, a TMS320C62xx from Texas Instruments Incorporated provides a saturating instruction for forming a 32-bit saturated result from a 40-bit operand. The increasing demands of technology and the marketplace make desirable even further structural and process improvements in processing devices, application systems and methods of operation and manufacture.

SUMMARY OF THE INVENTION

An illustrative embodiment of the present invention seeks to provide a microprocessor, and a method for operating a microprocessor that improves digital signal processing performance. Aspects of the invention are specified in the claims.

In an embodiment of the present invention, a digital signal processor is provided which has a set of instructions for saturating multiple fields of a selected set of source operands and storing the separate saturated results in a selected destination register.

In an embodiment of the invention, two 32-bit operands are treated as four 16-bit fields and the four fields are saturated separately. In another embodiment, an operand size different from 32-bits may be operated on, and the field sizes may be different than 16 bits.

In another embodiment of the invention, saturation circuitry is operable to selectively treat a field as either a signed value or an unsigned value.

In an embodiment of the invention, one instruction is provided which treats an operand pair as having two fields, and another instruction is provided that treats the operand pair as having four packed fields. In another embodiment, the number of fields may be different than two or four.

BRIEF DESCRIPTION OF THE DRAWINGS

Other features and advantages of the present invention will become apparent by reference to the following detailed description when considered in conjunction with the accompanying drawings, in which:

FIGS. 3A–3J show an opcode map for the DSP of FIG. 1;

DETAILED DESCRIPTION OF EMBODIMENTS OF THE INVENTION

Figure 1:
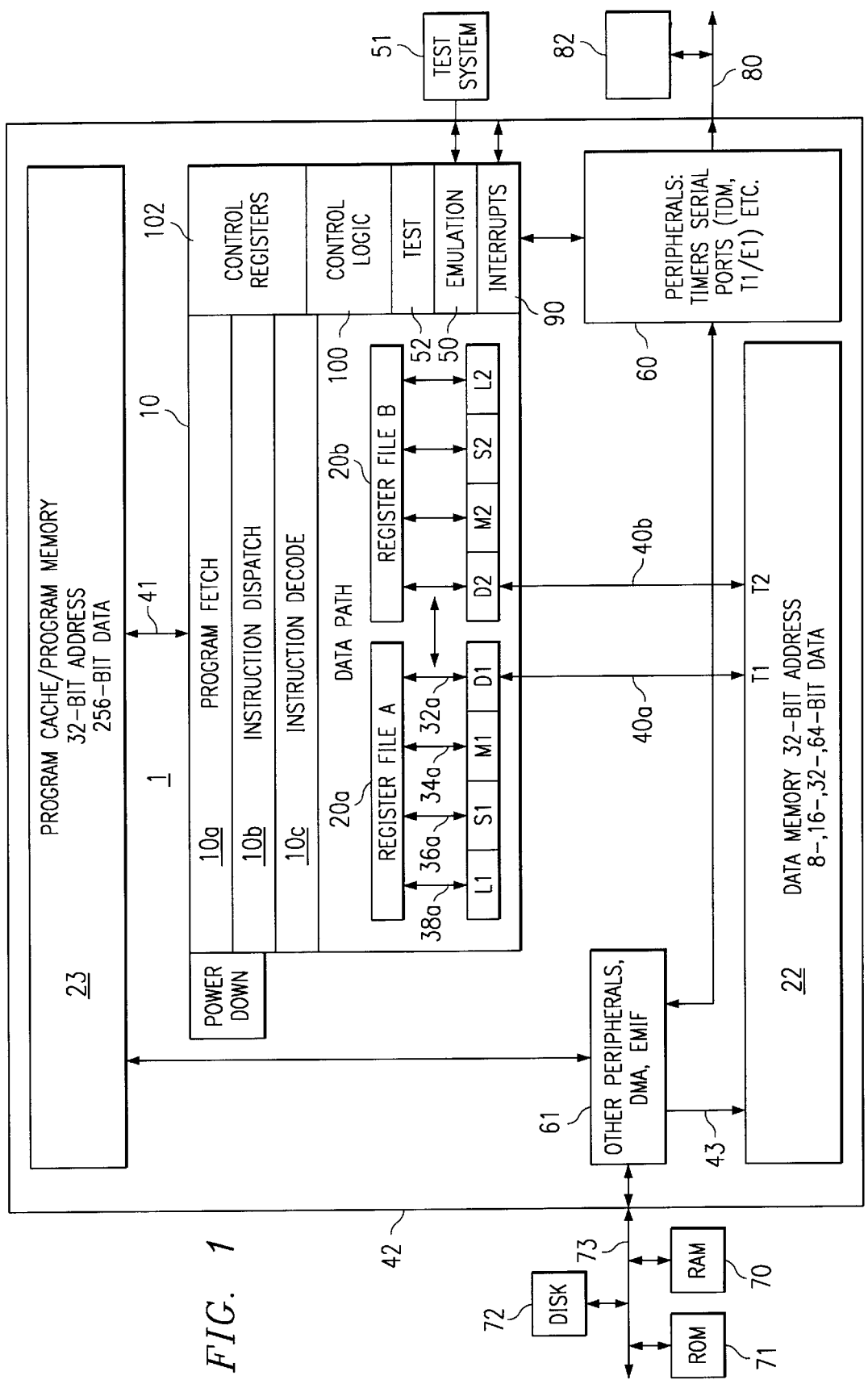
FIG. 1 is a block diagram of a digital signal processor (DSP), showing components thereof pertinent to an embodiment of the present invention.

FIG. 1 is a block diagram of a microprocessor 1 which has an embodiment of the present invention. Microprocessor 1 is a VLIW digital signal processor ("DSP"). In the interest of clarity, FIG. 1 only shows those portions of microprocessor 1 that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail and is incorporated herein by reference. U.S. Pat. No. 5,329,471 issued to Gary Swoboda, et al, describes in detail how to test and emulate a DSP and is incorporated herein by reference. Details of portions of microprocessor relevant to an embodiment of the present invention are explained in sufficient detail hereinbelow, so as to enable one of ordinary skill in the microprocessor art to make and use the invention.

In microprocessor 1 there are shown a central processing unit (CPU) 10, data memory 22, program memory 23, peripherals 60 and an external memory interface (EMIF) with a direct memory access (DMA) 61. CPU 10 further has an instruction fetch/decode unit 10a–c, a plurality of execution units, including an arithmetic and load/store unit D1, a multiplier M1, an ALU/shifter unit S1, an arithmetic logic unit ("ALU") L1, a shared multi-port register file 20a from which data are read and to which data are written. Instructions are fetched by fetch unit 10a from instruction memory 23 over a set of busses 41. Decoded instructions are provided from the instruction fetch/decode unit 10a–c to the functional units D1, M1, S1, and L1 over various sets of control lines which are not shown. Data are provided to/from the register file 20a from/to to load/store unit D1 over a first set of busses 32a, to multiplier M1 over a second set of busses 34a, to ALU/shifter unit S1 over a third set of busses 36a and to ALU L1 over a fourth set of busses 38a. Data are provided to/from the memory 22 from/to the load/store unit D1 via a fifth set of busses 40a. Note that the entire data path described above is duplicated with register file 20b and execution units D2, M2, S2, and L2. Load/store unit D2 similarly interfaces with memory 22 via a set of busses 40b. In this embodiment of the present invention, two unrelated aligned double word (64 bits) load/store transfers can be made in parallel between CPU 10 and data memory 22 on each clock cycle using bus set 40a and bus set 40b.

A single non-aligned double word load/store transfer is performed by scheduling a first .D unit resource and two load/store ports on memory 22. Advantageously, an extraction circuit is connected to the memory subsystem to provide a non-aligned data item extracted from two aligned data items requested by the .D unit. Advantageously, a second .D unit can perform 32-bit logical or arithmetic instructions in addition to the .S and .L units while the address port of the second .D unit is being used to transmit one of two contiguous addresses provided by the first .D unit. Furthermore, a non-aligned access near the end of a circular buffer region in the target memory provides a non-aligned data item that wraps around to the other end of the circular buffer.

Emulation circuitry 50 provides access to the internal operation of integrated circuit 1 that can be controlled by an external test/development system (XDS) 51. External test system 51 is representative of a variety of known test systems for debugging and emulating integrated circuits. One such system is described in U.S. Pat. No. 5,535,331 which is incorporated herein by reference. Test circuitry 52 contains control registers and parallel signature analysis circuitry for testing integrated circuit 1.

Note that the memory 22 and memory 23 are shown in FIG. 1 to be a part of a microprocessor, 1 integrated circuit, the extent of which is represented by the box 42. The memories 22–23 could just as well be external to the microprocessor 1 integrated circuit 42, or part of it could reside on the integrated circuit 42 and part of it be external to the integrated circuit 42. These are matters of design choice. Also, the particular selection and number of execution units are a matter of design choice, and are not critical to the invention.

When microprocessor 1 is incorporated in a data processing system, additional memory or peripherals may be connected to microprocessor 1, as illustrated in FIG. 1. For example, Random Access Memory (RAM) 70, a Read Only Memory (ROM) 71 and a Disk 72 are shown connected via an external bus 73. Bus 73 is connected to the External Memory Interface (WMIF) which is part of functional block 61 within microprocessor 1. A Direct Memory Access (DMA) controller is also included within block 61. The DMA controller part of functional block 61 connects to data memory 22 via bus 43 and is generally used to move data between memory and peripherals within microprocessor 1 and memory and peripherals which are external to microprocessor 1.

In the present embodiment, CPU core 10 is encapsulated as a MegaModule, however, other embodiments of the present invention may be in custom designed CPU's or mass market microprocessors, for example.

A detailed description of various architectural features of the microprocessor of FIG. 1 is provided in coassigned U.S. Pat. No. 6,182,203 and is incorporated herein by reference. A description of enhanced architectural features and an extended instruction set not described herein for CPU 10 is provided in coassigned U.S. patent application Ser. No. 09/703,096 Microprocessor with Improved Instruction Set Architecture and is incorporated herein by reference.

Figure 2:
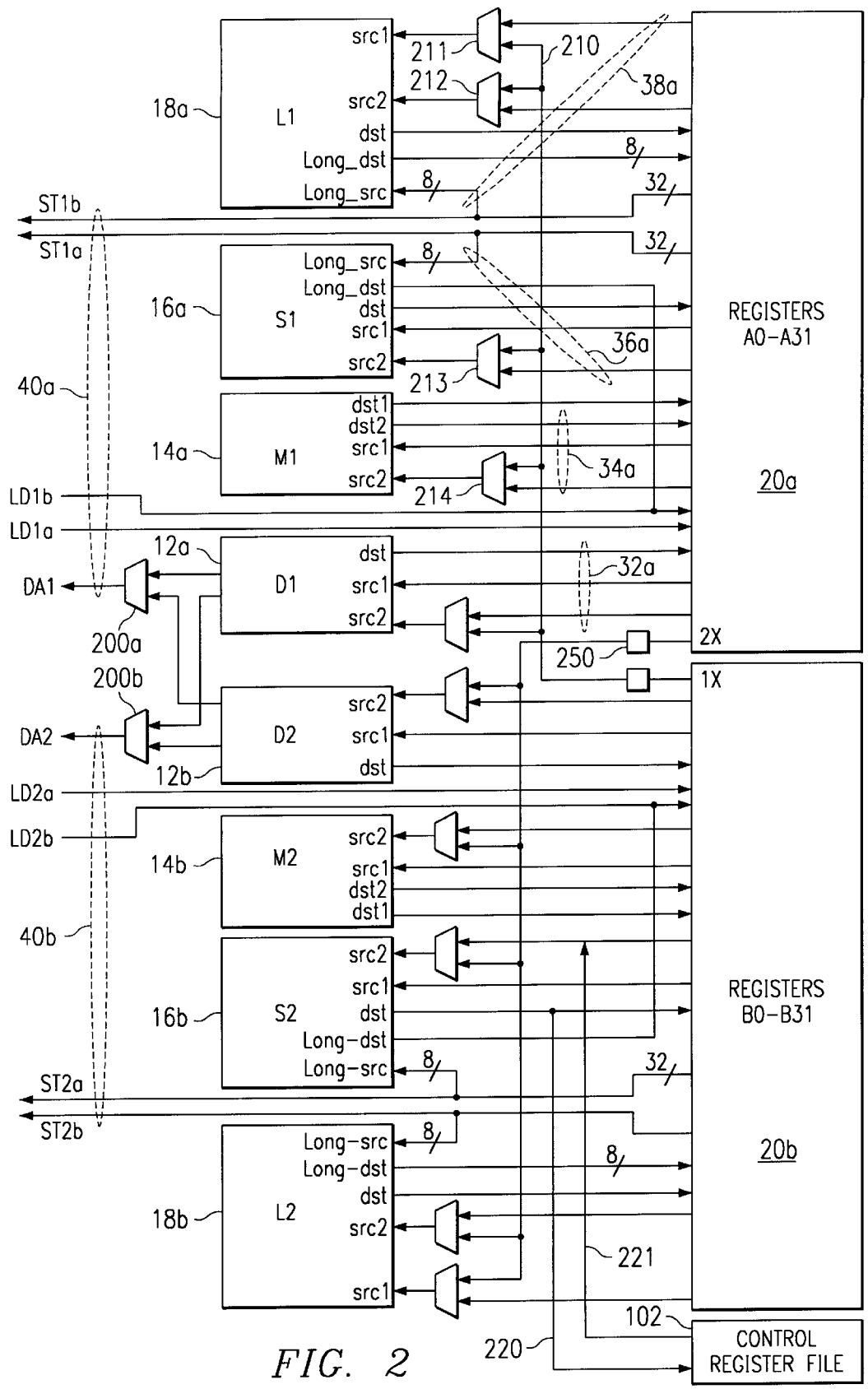
FIG. 2 is a block diagram of the functional units, data paths and register files of FIG. 1.

FIG. 2 is a block diagram of the execution units and register files of the microprocessor of FIG. 1 and shows a more detailed view of the buses connecting the various functional blocks. In this figure, all data busses are 32 bits wide, unless otherwise noted. There are two general-purpose register files (A and B) in the processor's data paths. Each of these files contains 32 32-bit registers (A0–A31 for register file A 20a and B0–B31 for register file B 20b). The general-purpose registers can be used for data, data address pointers, or condition registers. Any number of reads of a given register can be performed in a given cycle.

The general-purpose register files support data ranging in size from packed 8-bit data through 64-bit fixed-point data. Values larger than 32 bits, such as 40-bit long and 64-bit double word quantities, are stored in register pairs, with the 32 LSBs of data placed in an even-numbered register and the remaining 8 or 32 MSBs in the next upper register (which is always an odd-numbered register). Packed data types store either four 8-bit values or two 16-bit values in a single 32-bit register.

There are 32 valid register pairs for 40-bit and 64-bit data, as shown in Table 1. In assembly language syntax, a colon between the register names denotes the register pairs and the odd numbered register is encoded in the instruction opcode.

TABLE 1

40-Bit/64-Bit Register Pairs

| Register Files | |
|---|---|
| A | B |
| A1:A0 | B1:B0 |
| A3:A2 | B3:B2 |
| A5:A4 | B5:B4 |
| A7:A6 | 67:B6 |
| A9:A8 | B9:B8 |
| A11:A10 | B11:B10 |
| A13:A12 | B13:B12 |
| A15:A14 | B15:B14 |
| A17:A16 | B17:B16 |
| A19:A18 | B19:B18 |
| A21:A20 | B21:B20 |
| A23:A22 | B23:B22 |
| A25:A24 | B25:B24 |
| A27:A26 | B27:B26 |
| A29:A28 | B29:B28 |
| A31:A30 | B31:B30 |

For 40-bit data, operations requiring a long input ignore the 24 MSBs of the odd register. Operations producing a long result zero-fill the 24 MSBs of the odd register. The even register is encoded in the opcode.

The eight functional units in processor 10's data paths are be divided into two groups of four; each functional unit in one data path is almost identical to the corresponding unit in the other data path. The functional units are described in Table 2.

Besides being able to perform 32-bit data manipulations, processor 10 also contains many 8-bit and 16-bit data instructions in the instruction set. For example, the MPYU4 instruction performs four 8×8 unsigned multiplies with a single instruction on a .M unit. The ADD4 instruction performs four 8-bit additions with a single instruction on a .L unit.

TABLE 2

Functional Units and Operations Performed

| Functional Unit | Fixed-Point Operations |
|---|---|
| .L unit (.L1, .L2) | 32/40-bit arithmetic and compare operations |
| | 32-bit logical operations |
| | Leftmost 1 or 0 counting for 32 bits |
| | Normalization count for 32 and 40 bits |
| | Byte shifts |
| | Data packing/unpacking |
| | 5-bit constant generation |
| | Paired 16-bit arithmetic operations |
| | Quad 8-bit arithmetic operations |
| | Paired 16-bit min/max operations |
| | Quad 8-bit min/max operations |
| .S unit (.S1, .S2) | 32-bit arithmetic operations |
| | 32/40-bit shifts and 32-bit bit-field operations |
| | 32-bit logical operations |
| | Branches |
| | Constant generation |
| | Register transfers to/from control register file (.S2 only) |
| | Byte shifts |
| | Data packing/unpacking |
| | Paired 16-bit compare operations |
| | Quad 8-bit compare operations |
| | Paired 16-bit shift operations |
| | Paired 16-bit saturated arithmetic operations |
| | Quad 8-bit saturated arithmetic operations |
| .M unit (.M1, .M2) | 16 × 16 multiply operations |
| | 16 × 32 multiply operations |
| | Bit expansion |
| | Bit interleaving/de-interleaving |
| | Quad 8 × 8 multiply operations |
| | Paired 16 × 16 multiply operations |
| | Paired 16 × 16 multiply with add/subtract operations |
| | Quad 8 × 8 multiply with add operations |
| | Variable shift operations |
| | Rotation |
| | Galois Field Multiply |
| .D unit (.D1, .D2) | 32-bit add, subtract, linear and circular address calculation |
| | Loads and stores with 5-bit constant offset |
| | Loads and stores with 15-bit constant offset (.D2 only) |
| | Load and store double words with 5-bit constant |
| | Load and store non-aligned words and double words |
| | 5-bit constant generation |
| | 32-bit logical operations |

Most data lines in the CPU support 32-bit operands, and some support long (40-bit) and double word (64-bit) operands. Each functional unit has its own 32-bit write port into a general-purpose register file (Refer to FIG. 2). All units ending in 1 (for example, .L1) write to register file A 20a and all units ending in 2 write to register file B 20b. Each functional unit has two 32-bit read ports for source operands src1 and src2. Four units (.L1, .L2, .S1, and .S2) have an extra 8-bit-wide port for 40-bit long writes, as well as an 8-bit input for 40-bit long reads. Because each unit has its own 32-bit write port, when performing 32-bit operations all eight units can be used in parallel every cycle. Since each multiplier can return up to a 64-bit result, two write ports (dst1 and dst2 are provided from the multipliers to the respective register file.

Register File Cross Paths

Each functional unit reads directly from and writes directly to the register file within its own data path. That is, the .L1 unit 18a, .S1 unit 16a, .D1 unit 12a, and .M1 unit 14a write to register file A 20a and the .L2 unit 18b, .S2 unit 16b, .D2 unit 12b, and .M2 unit 14b write to register file B 20b. The register files are connected to the opposite-side register file's functional units via the 1X and 2X cross paths. These cross paths allow functional units from one data path to access a 32-bit operand from the opposite side's register file. The 1X cross path allows data path A's functional units to read their source from register file B. Similarly, the 2X cross path allows data path B's functional units to read their source from register file A.

All eight of the functional units have access to the opposite side's register file via a cross path. The .M1, .M2, .S1, .S2, .D1, and .D2 units' src2 inputs are selectable between the cross path and the same side register file. In the case of the .L1 and .L2 both src1 and src2 inputs are also selectable between the cross path and the same-side register file. Cross path 1X bus 210 couples one input of multiplexer 211 for src1 input of .L1 unit 18a, multiplexer 212 for src2 input of .L1 unit 18a, multiplexer 213 for src2 input of .S1 unit 16a and multiplexer 214 for src2 input of .M1 unit 14a. Multiplexers 211, 212, 213, and 214 select between the cross path 1X bus 210 and an output of register file A 20a. Buffer 250 buffers cross path 2X output to similar multiplexers for .L2, .S2, .M2, and .D2 units.

Only two cross paths, 1X and 2X, exist in this embodiment of the architecture. Thus the limit is one source read from each data path's opposite register file per cycle, or a total of two cross-path source reads per cycle. Advantageously, multiple units on a side may read the same cross-path source simultaneously. Thus the cross path operand for one side may be used by any one, multiple or all the functional units on that side in an execute packet. In the C62x/C67x, only one functional unit per data path, per execute packet could get an operand from the opposite register file.

A delay clock cycle is introduced whenever an instruction attempts to read a register via a cross path that was updated in the previous cycle. This is known as a cross path stall. This stall is inserted automatically by the hardware; no NOP instruction is needed. It should be noted that no stall is introduced if the register being read is the destination for data loaded by a LDx instruction.

S2 unit 16b may write to control register file 102 from its dst output via bus 220. S2 unit 16b may read from control register file 102 to its src2 input via bus 221.

Memory, Load and Store Paths

Processor 10 supports double word loads and stores. There are four 32-bit paths for loading data for memory to the register file. For side A, LD1a is the load path for the 32 LSBs; LD1b is the load path for the 32 MSBs. For side B, LD2a is the load path for the 32 LSBs; LD2b is the load path for the 32 MSBs. There are also four 32-bit paths, for storing register values to memory from each register file. ST1a is the write path for the 32 LSBs on side A; ST1b is the write path for the 32 MSBs for side A. For side B, ST2a is the write path for the 32 LSBs; ST2b is the write path for the 32 MSBs.

Some of the ports for long and double word operands are shared between functional units. This places a constraint on which long or double word operations can be scheduled on a datapath in the same execute packet.

Data Address Paths

Bus 40a has an address bus DA1 which is driven by mux 200a. This allows an address generated by either load/store unit D1 or D2 to provide a memory address for loads or stores for register file 20a. Data Bus LD1 loads data from an address in memory 22 specified by address bus DA1 to a register in load unit D1. Unit D1 may manipulate the data provided prior to storing it in register file 20a. Likewise, data bus ST1 stores data from register file 20a to memory 22. Load/store unit D1 performs the following operations: 32-bit add, subtract, linear and circular address calculations. Load/store unit D2 operates similarly to unit D1 via bus 40b, with the assistance of mux 200b for selecting an address.

The DA1 and DA2 resources and their associated data paths are specified as T1 and T2 respectively. T1 consists of the DA1 address path and the LD1a, LD1b, ST1a and ST1b data paths. Similarly, T2 consists of the DA2 address path and the LD2a, LD2b, ST2a and ST2b data paths. The T1 and T2 designations appear in functional unit fields for load and store instructions.

For example, the following load instruction uses the .D1 unit to generate the address but is using the LD2a path resource from DA2 to place the data in the B register file. The use of the DA2 resource is indicated with the T2 designation, for example: LDW .D1T2 *A0[3], B1.

Table 3 defines the mapping between instructions and functional units for a set of basic instructions included in a DSP described in U.S. patent application Ser. No. 09/012,813 (TI-25311, incorporated herein by reference) now U.S. Pat. No. 6,182,203, Table 4 defines a mapping between instructions and functional units for a set of extended instructions in an embodiment of the present invention. Alternative embodiments of the present invention may have different sets of instructions and functional unit mapping. Table 3 and Table 4 are illustrative and are not exhaustive or intended to limit various embodiments of the present invention.

TABLE 3

Instruction to Functional Unit Mapping of Basic Instructions

| .L Unit | .M Unit | .S Unit | .D Unit |
|---------|---------|---------|---------|
| ABS | MPY | ADD | ADD |
| ADD | SMPY | ADDK | ADDA |
| AND | | ADD2 | LD mem |
| CMPEQ | | AND | LD mem (15-bit offset) (D2 only) |
| CMPGT | | B disp | MV |
| CMPGTU | | B IRP | NEG |
| CMPLT | | B NRP | ST mem |
| CMPLTU | | B reg | ST mem (15-bit offset) (D2 only) |
| LMBD | | CLR | SUB |
| MV | | EXT | SUBA |
| NEG | | EXTU | ZERO |
| NORM | | MVC | |
| NOT | | MV | |
| OR | | MVK | |
| SADD | | MVKH | |
| SAT | | NEG | |
| SSUB | | NOT | |
| SUB | | OR | |
| SUBC | | SET | |
| XOR | | SHL | |
| ZERO | | SHR | |
| | | SHRU | |
| | | SSHL | |
| | | STP (S2 only) | |
| | | SUB | |
| | | SUB2 | |
| | | XOR | |
| | | ZERO | |

TABLE 4

Instruction to Functional Unit Mapping of Extended Instructions

| .L unit | .M unit | .S unit | .D unit |
|---|---|---|---|
| ABS2 | AVG2 | ADD2 | ADD2 |
| ADD2 | AVGU4 | ADDKPC | AND |
| ADD4 | BITC4 | AND | ANDN |
| AND | BITR | ANDN | LDDW |
| ANDN | DEAL | BDEC | LDNDW |
| MAX2 | DOTP2 | BNOP | LDNW |
| MAXU4 | DOTPN2 | BPOS | MVK |
| MIN2 | DOTPNRSU2 | CMPEQ2 | OR |
| MINU4 | DOTPNRUS2 | CMPEQ4 | STDW |
|  | DOTPRSU2 | CMPGT2 |  |
|  | DOTPRUS2 | CMPGTU4 |  |
| MVK | DOTPSU4 | CMPLT2 | STNDW |
|  | DOTPUS4 |  |  |
| OR | DOTPU4 | CMPLTU4 | STNW |
| PACK2 | GMPY4 | MVK | SUB2 |
| PACKH2 | MPY2 | OR | XOR |
| PACKH4 | MPYHI | PACK2 |  |
| PACKHL2 | MPYHIR | PACKH2 |  |
|  | MPYIH |  |  |
|  | MPYIHR |  |  |
| PACKL4 | MPYIL | PACKHL2 |  |
|  | MPYILR |  |  |
|  | MPYLI |  |  |
| PACKLH2 | MPYLIR | PACKLH2 |  |
| SHLMB | MPYSU4 | SADD2 |  |
|  | MPYUS4 |  |  |
| SHRMB | MPYU4 | SADDU4 |  |
| SUB2 | MVD | SADDSU2 |  |
|  |  | SADDUS2 |  |
| SUB4 | ROTL | SHLMB |  |
| SUBABS4 | SHFL | SHR2 |  |
| SWAP2 | SMPY2 | SHRMB |  |
| SWAP4 | SSHVL | SHRU2 |  |
| UNPKHU4 | SSHVR | SPACK2 |  |
| UNPKLU4 | XPND2 | SPACKU4 |  |
| XOR | XPND4 | SUB2 |  |
|  |  | SWAP2 |  |
|  |  | UNPKHU4 |  |
|  |  | UNPKLU4 |  |
|  |  | XOR |  |

The DSP's opcode map is shown in FIGS. 3A–3J. Refer to the instruction descriptions later herein for explanations of the field syntax and values. An instruction syntax is used to describe each instruction. The opcode map breaks down the various bit fields that make up each instruction. There are certain instructions that can be executed on more than one functional unit, as was shown in Table 4. The syntax specifies the functional unit and various resources used by an instruction, typically as follows:

EXAMPLE (.unit) src, dst

The following are examples of what the syntax looks like for the ADD instruction:

1) ADD (.unit) src1, src2, dst
2) ADDU (.unit) src1, src2, dst
3) ADD (.unit) src2, src1, dst
   unit=.L1, .L2, .S1, .S2, .D1, .D2
   src and dst indicate source and destination respectively.
   The (.unit) dictates which functional unit the instruction is mapped to (.L1, .L2, .S1, .S2, .M1, .M2, .D1, or .D2). This instruction has three opcode map fields: src1, src2, and dst.

The addressing modes for instructions that access memory are linear, circular using BK0, and circular using BK1. The mode is specified by an addressing mode register (AMR) contained in control register file 102. Eight registers can perform circular addressing. A4–A7 are used by the .D1 unit and B4–B7 are used by the .D2 unit. No other units can perform circular addressing modes. For each of these registers, the AMR specifies the addressing mode.

All instructions can be conditional. The condition is controlled by a 3-bit (creg) field specifying a register to be tested, and a 1-bit field (z) specifying a test for zero or nonzero, as shown in FIGS. 3A–3J. The four MSBs of every opcode are creg and z. The specified register is tested at the beginning of the E1 instruction execution pipeline stage for all instructions. The pipeline is described later herein. If z=1, the test is for equality with zero. If z=0, the test is for nonzero. The case of condition register field (creg)=0 and z=0 is treated as always true to allow instructions to be executed unconditionally. The creg register field is encoded as shown in Table 5. Conditional instructions are represented by "[ ]" surrounding the condition register.

TABLE 5

Registers That Can Be Tested by Conditional Operations

| Creg | | | z | Register Tested |
|---|---|---|---|---|
| 31 | 30 | 29 | 28 |  |
| 0 | 0 | 0 | 0 | Unconditional. |
| 0 | 0 | 0 | 1 | Reserved: When selected this indicates a SWBP instruction |
| 0 | 0 | 1 | z | B0 |
| 0 | 1 | 0 | z | B1 |
| 0 | 1 | 1 | z | B2 |
| 1 | 0 | 0 | z |  |
| 1 | 0 | 0 | z | A1 |
| 1 | 0 | 1 | z | A2 |
| 1 | 1 | x | x | Reserved |

Note: x is don't care for reserved cases.

Instructions are always fetched eight at a time. This constitutes a fetch packet. The execution grouping of the fetch packet is specified by the p-bit, bit zero, of each instruction. Fetch packets are 8-word aligned.

The p bit controls the parallel execution of instructions. The p bits are scanned from left to right (lower to higher address). If the p bit of instruction i is 1, then instruction i+1 is to be executed in parallel with (in the same cycle as) instruction i. If the p-bit of instruction i is 0, then instruction i+1 is executed in the cycle after instruction i. All instructions executing in parallel constitute an execute packet. An execute packet can contain up to eight instructions. All instructions in an execute packet must use a unique functional unit.

Pipeline Operation

The DSP pipeline has several key features which improve performance, decrease cost, and simplify programming. They are: increased pipelining eliminates traditional architectural bottlenecks in program fetch, data access, and multiply operations; control of the pipeline is simplified by eliminating pipeline interlocks; the pipeline can dispatch eight parallel instructions every cycle; parallel instructions proceed simultaneously through the same pipeline phases; sequential instructions proceed with the same relative pipeline phase difference; and load and store addresses appear on the CPU boundary during the same pipeline phase, eliminating read-after-write memory conflicts.

A multi-stage memory pipeline is present for both data accesses and program fetches. This allows use of high-speed synchronous memories both on-chip and off-chip, and allows infinitely nestable zero-overhead looping with branches in parallel with other instructions.

There are no internal interlocks in the execution cycles of the pipeline, so a new execute packet enters execution every CPU cycle. Therefore, the number of CPU cycles for a particular algorithm with particular input data is fixed. If during program execution, there are no memory stalls, the number of CPU cycles equals the number of clock cycles for a program to execute.

Performance can be inhibited by stalls from the memory system, stalls for cross path dependencies, or interrupts. The reasons for memory stalls are determined by the memory architecture. Cross path stalls are described in detail in U.S. patent application Ser. No. 09/702,453, to Steiss, et al and is incorporated herein by reference. To filly understand how to optimize a program for speed, the sequence of program fetch, data store, and data load requests the program makes, and how they might stall the CPU should be understood.

Figure 4:
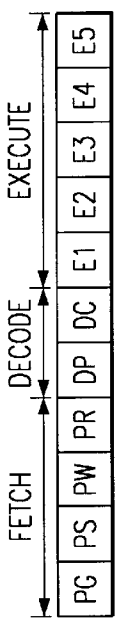
FIG. 4 is a timing diagram illustrating instruction execution pipeline phase of the processor of FIG. 1.

The pipeline operation, from a functional point of view, is based on CPU cycles. A CPU cycle is the period during which a particular execute packet is in a particular pipeline stage. CPU cycle boundaries always occur at clock cycle boundaries; however, stalls can cause CPU cycles to extend over multiple clock cycles. To understand the machine state at CPU cycle boundaries, one must be concerned only with the execution phases (E1–E5) of the pipeline. The phases of the pipeline are shown in FIG. 4 and described in Table 6.

The execution of instructions can be defined in terms of delay slots, as shown in Table 7. A delay slot is a CPU cycle that occurs after the first execution phase (E1) of an instruction in which results from the instruction are not available. For example, a multiply instruction has 1 delay slot, this means that there is 1 CPU cycle before another instruction can use the results from the multiply instruction.

TABLE 7

Delay Slot Summary

| Instruction Type | Delay Slots | Execute Stages Used |
|---|---|---|
| Branch (The cycle when the target enters E1) | 5 | E1-branch target E1 |
| Load (LD) (Incoming Data) | 4 | E1–E5 |
| Load (LD) (Address Modification) | 0 | E1 |
| Multiply | 1 | E1–E2 |
| Single-cycle | 0 | E1 |
| Store | 0 | E1 |
| NOP (no execution pipeline operation) | — | — |

TABLE 6

Pipeline Phase Description

| Pipeline | Pipeline Phase | Symbol | During This Phase | Instruction Types Completed |
|---|---|---|---|---|
| Program Fetch | Program Address Generate | PG | Address of the fetch packet is determined. | |
| | Program Address Send | PS | Address of fetch packet is sent to memory. | |
| | Program Wait | PW | Program memory access is performed. | |
| | Program Data Receive | PR | Fetch packet is expected at CPU boundary. | |
| Program Decode | Dispatch | DP | Next execute packet in fetch packet determined and sent to the appropriate functional units to be decoded. | |
| | Decode | DC | Instructions are decoded at functional units. | |
| Execute | Execute 1 | E1 | For all instruction types, conditions for instructions are evaluated and operands read. Load and store instructions: address generation is computed and address modifications written to register file† Branch instructions: affects branch fetch packet in PG phase† Single-cycle instructions: results are written to a register file† | Single-cycle |
| | Execute 2 | E2 | Load instructions: address is sent to memory† Store instructions and STP: address and data are sent to memory† Single-cycle instructions that saturate results set the SAT bit in the Control Status Register (CSR) if saturation occurs.† Multiply instructions: results are written to a register file† | Stores STP Multiplies |
| | Execute 3 | E3 | Data memory accesses are performed. Any multiply instruction that saturates results sets the SAT bit in the Control Status Register (CSR) if saturation occurs.† | |
| | Execute 4 | E4 | Load instructions: data is brought to CPU boundary† | |
| | Execute 5 | E5 | Load instructions: data is loaded into register† | Loads |

†This assumes that the conditions for the instructions are evaluated as true. If the condition is evaluated as false, the instruction will not write any results or have any pipeline operation after E1.

Referring again to FIG. 4 and FIG. 1, the instruction execution pipeline of processor 10 involves a number of discrete stages, generally demarcated by temporary latches or registers to pass the results of one stage to the next. Instruction pipeline phases PG, PS, PW, and PR all involve instruction fetching and are embodied in program fetch circuit 10 in association with program memory subsystem 23. Pipeline phases DP and DC involve instruction decoding; phase DP is embodied in dispatch circuitry 10b, while pipeline phase DC is embodied in decode circuitry 10c. The execution phases E1–E5 are embodied in stages embodied within each functional unit L, S, M and D. For example, the D units embody all five execute stage in association with memory subsystem 22. Other of the functional units do not embody all five execution phase, but only what is required for the instruction types that are executed by a particular functional unit.

TABLE 7-continued

Delay Slot Summary

| Instruction Type | Delay Slots | Execute Stages Used |
|---|---|---|
| STP (no CPU internal results written) | — | — |

Single cycle instructions execute during the E1 phase of the pipeline. The operand is read, operation is performed and the results are written to a register all during E1. These instructions have no delay slots.

Multiply instructions complete their operations during the E2 phase of the pipeline. In the E1 phase, the operand is read and the multiply begins. In the E2 phase, the multiply finishes, and the result is written to the destination (dst) register. Multiply instructions have 1 delay slot.

Load instructions have two results: data loaded from memory and address pointer modification.

Data loads complete their operations during the E5 phase of the pipeline. In the E1 phase, the address of the data is computed. In the E2 phase, the data address is sent to data memory. In the E3 phase, a memory read is performed. In the E4 stage, the data is received at the CPU core boundary. Finally, in the E5 phase, the data is loaded into a register. Because data is not written to the register until E5, these instructions have 4 delay slots. Because pointer results are written to the register in E1, there are no delay slots associated with the address modification.

Store instructions complete their operations during the E3 phase of the pipeline. In the E1 phase, the address of the data is computed. In the E2 phase, the data address is sent to data memory. In the E3 phase, a memory write is performed. The address modification is performed in the E1 stage of the pipeline. Even though stores finish their execution in the E3 phase of the pipeline, they have no delay slots and follow the following rules (i=cycle):

1) When a load is executed before a store, the old value is loaded and the new value is stored.

2) When a store is executed before a load, the new value is stored and the new value is loaded.

3) When the instructions are in are in parallel, the old value is loaded and the new value is stored.

Saturated, Packed 8-bit and 16-bit (SPACK2, SPACKU4) Instructions

An aspect of the present invention is that the DSP of FIG. 1 includes an extensive set of packed data instructions that provide features of single instruction, multiple data (SIMD) operation. By so doing, performance of the processor is improved. One such instruction is the Saturated, Unsigned Packed 8-bit (SPACKU4) instruction. Another instruction included in the present embodiment is a Saturated, Signed Packed 16-Bit (SPACK2) instruction.

Figure 5:
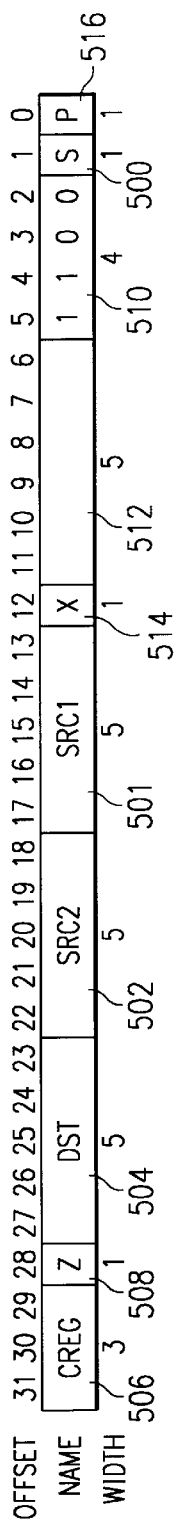
FIG. 5 illustrates an instruction syntax for multi-field saturation (SPACK2/SPACKU4) instructions.

FIG. 5 illustrates an instruction syntax for an SPACK2 instruction. This same syntax is used for an SPACKU4. In this embodiment, an SPACK2/U4 instruction can be executed in either .S functional unit 16a or 16b as indicated by unit select bit field 500. The instruction includes a first source operand field (src1) 501 and a second source operand field (src2) 502 that each select a register from associated register file 20a or 20b to access a source operand which is a 32-bit data value. The SPACK2/U4 instructions each perform a saturation operation on separate fields from the source operands. The values in the source operands are treated as packed data, and the result is written in a corresponding packed format. For each field in the pair of source operands, a saturated value is written to the corresponding position in a destination register specified by a destination field (dst) 504.

Referring still to FIG. 5, field 510 defines a class of instruction formats, while opcode field 512 specifies that a particular instruction of this class is an SPACK2 or SPACKU4 instruction. Crossover control field 514 specifies which register file 20a or 20b will be accessed for a source operand, as discussed previously. Parallel bit 516 indicates if this instruction is to be executed in parallel with an adjacent instruction in a fetch packet, as discussed previously.

As with all of the instructions executed by the DSP of FIG. 1, the SPACK2/U4 instructions are conditional based on a predicate register selected by condition register field (creg) 506 and zero indicator bit 508, as discussed previously.

Table 8 defines the operation of the SPACK2 instruction, while Table 9 defines the operation of the SPACKU4 instruction using pseudo code. Just as with other conditionally executed instructions, if the predicate condition tests false, SPACK2/U4 does not complete execution and the write of the dst register is inhibited.

TABLE 8

Execution of SPACK2 Instruction if (cond) {
    if src2 > 0x00007fff, then 0x7fff → lsb16(dst) or
    if src2 < 0xffff8000, then 0x8000 = lsb16(dst)
    else truncate(src2) → lsb16(dst);
        if src1 > 0x00007fff, then 0x7fff → msb16(dst) or
        if src1 < 0xffff8000, then 0x8000 → msb16(dst)
    else truncate(src1) → msb16(dst);
    }
else nop

TABLE 9

Figure 6A:
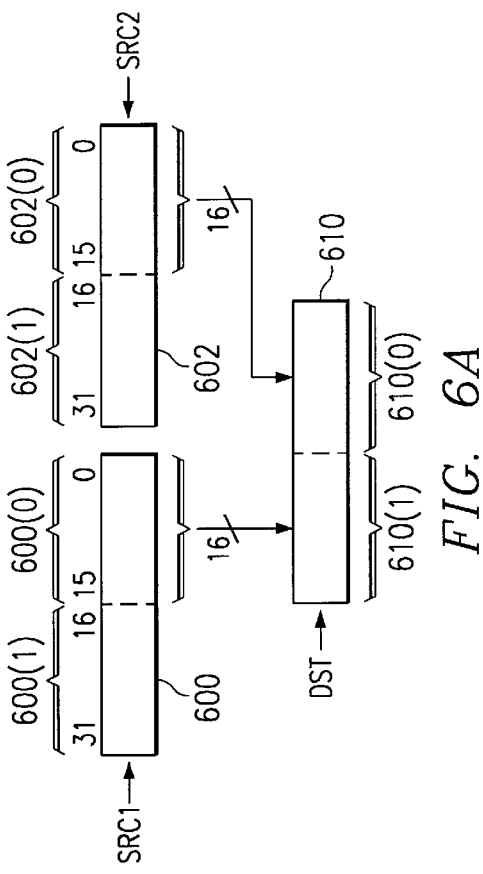
FIG. 6A is a flow chart illustrating operation of an SPACK2 instruction.

Execution of SPACKU4 Instruction if (cond) {
    if msb16(src1) >> 0x0000007f, then 0x7f → ubyte3(dst) or
    if msb16(src1) << 0x00000000, then 0 → ubyte3(dst)
  else truncate(msb16(src1)) → ubyte3(dst);
    if lsb16(src1) >> 0x0000007f, then 0x7f → ubyte2(dst) or
    if lsb16(src1) << 0x00000000, then 0 → ubyte2(dst)
  else truncate(lsb16(src1)) → ubyte2(dst);
    if msb16(src2) >> 0x0000007f, then 0x7f → ubyte1(dst) or
    if msb16(src2) << 0x00000000, then 0 → ubyte1(dst)
  else truncate(msb16(src2)) → ubyte1(dst);
    if lsb16(src2) >> 0x0000007f, then 0x7f → ubyte0(dst) or
    if lsb16(src2) << 0x00000000, then 0 → ubyte0(dst)
  else truncate(lsb16(src2)) → ubyte0(dst);
{
else nop FIG. 6A is a flow chart illustrating operation of an SPACK2 instruction. The SPACK2 instruction performs a saturation operation on two source operands and forms a packed 16-bit data result. The SPACK2 instruction takes two signed 32-bit quantities in a first source operand (src1) 600 and a second source operand (src2) 602 and saturates them to signed 16-bit quantities. A portion 600(1), 602(1) of each operand is truncated. The signed 16-bit results are then packed into a signed packed 16-bit format and written to a selected destination operand (dst) 610. Specifically, the saturated 16-bit signed value of src1 is written to the upper half word of dst and the saturated 16-bit signed value of src2 is written to the lower half word of dst.

Saturation is performed on each operand value independently. The input values start as signed 32-bit quantities, and are saturated to 16-bit quantities according to the following rules:

1) If the value is in the range $-2^{15}$ to $2^{15}-1$, inclusive, then no saturation is performed and the value is merely truncated to 16 bits. The least significant portion (lsp) 600(0), 602(0) of each operand is packed into destination operand 610.

2) If the value is greater than $2^{15}-1$, then the result is set to $2^{15}-1$. In this case, the saturated result indicates an excessively positive value.

3) If the value is less than $-2^{15}$, then the result is set to $-2^{15}$. In this case, the saturated result indicates an excessively negative value.

This instruction is useful in code which manipulates 16-bit data at 32-bit precision for its intermediate steps, but which requires the final results to be in a 16-bit representation. The saturate step ensures that any values outside the signed 16-bit range are clamped to the high or low end of the range before being truncated to 16 bits.

For example, for the following instruction: SPACK2 .S1 A0, A1, A2; if a source operand in register A0 (the first selected source operand) contained a value of 3789 F23Ah (which in decimal is 931,787,322), and a source operand in register A1 (the second selected source operand) contained a value of 04B8 4975h (which in decimal is 79,186,293) then at the completion of execution, register A2 (the selected destination register) will contain a value of 7FFF 7FFFh (decimal 32767 and 32767). Note that in this example, the saturated result placed in field 610(0) and in field 610(1) is a maximum positive number, which indicates each of the source operands contained excessively positive numbers. In this embodiment, the destination is written during pipeline phase E1 and the SPAVK2 instruction is categorized has having no delay slots.

For another example, for the following instruction: SPACK2 .S2 A0, A1, A2; if a source operand in register A0 (the first selected source operand) contained a value of A124 2451h (which in decimal is −1,591,466,927), and a source operand in register A1 (the second selected source operand) contained a value of 01A6 A051h (which in decimal is 27,697,233) then at the completion of execution, register A2 (the selected destination register) will contain a value of 8000 7FFFh (decimal −32768 and 32767). Note that in this example, the saturated result placed in field 610(0) indicates an excessively positive number and the saturated result placed in field 610(1) indicates the source operand contained an excessively negative number.

Figure 6B:
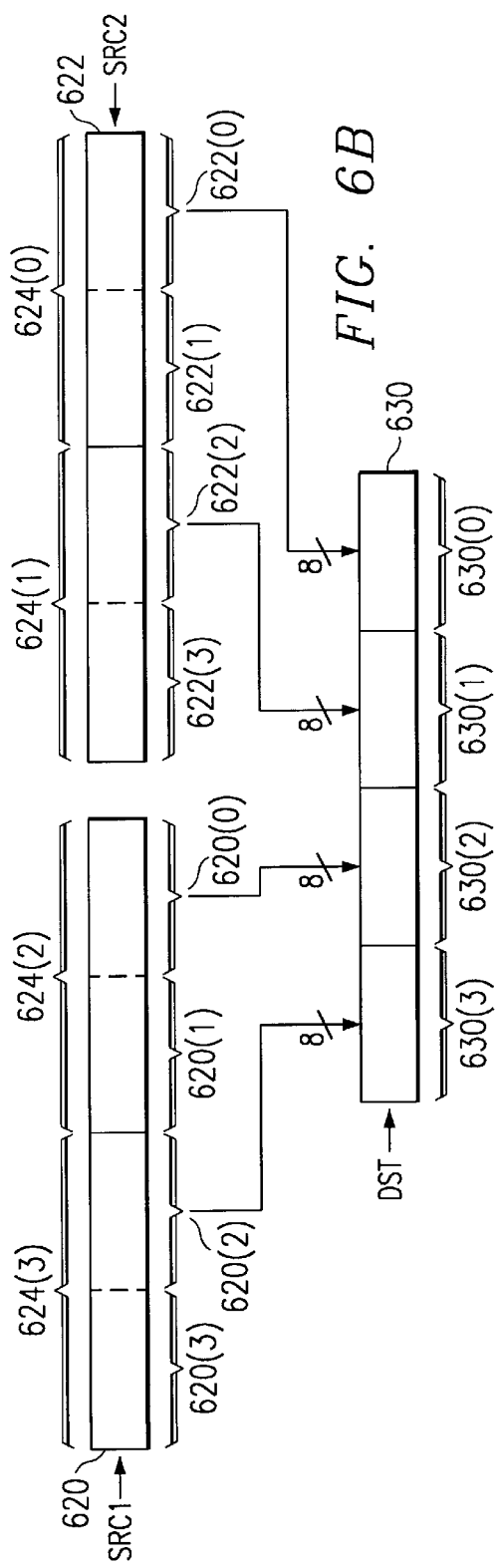
FIGS. 6B is a flow chart illustrating operation of an SPACKU4 instruction.

FIG. 6B is a flow chart illustrating operation of an SPACKU4 instruction. The SPACKU4 instruction takes four signed 16-bit values 624(0–3) and saturates them to unsigned 8-bit quantities 630(0–3). The values in src1 620 and src2 622 are treated as signed packed 16-bit quantities. The results are written into dst 630 in an unsigned packed 8-bit format.

Each signed 16-bit quantity in src1 and src2 is saturated to an unsigned 8-bit quantity as described below. The resulting quantities are then packed into an unsigned packed 8-bit format. Specifically, the upper half word 624(3) of src1 is used to produce the most significant byte 630(3) of dst. The lower half 624(2) of src1 is used to produce the second most significant byte 630(2) (bits 16 to 23) of dst. The upper half word 624(1) of src2 is used to produce the third most significant byte 630(1) (bits 8 to 15) of dst. The lower half word 624(0) of src2 is used to produce the least significant byte 630(0) of dst.

Saturation is performed on each signed 16-bit field independently, producing separate unsigned 8-bit results. For each field, the following tests are applied:

1) If the value is in the range 0 to $2^8-1$, inclusive, then no saturation is performed and the result is truncated to 8 bits. The least significant portion (lsp) 620(0), 620(2), 622(0), 622(2) of each field is packed into destination operand 630.

2) If the value is greater than $2^8-1$, then the result is set to $2^8-1$. In this case, the saturated result indicates an excessively positive value.

3) If the value is less than 0, the result is set to 0. In this case, the saturated result indicates an excessively negative value.

For example, for the following instruction: SPACKU4 .S1 A0, A1, A2; if a source operand in register A0 (the first selected source operand) contained a value of 3789 F23Ah (which in decimal is 14217 and −3526), and a source operand in register A1 (the second selected source operand) contained a value of 04B8 4975h (which in decimal is 1208 and 18805) then at the completion of execution, register A2 (the selected destination register) will contain a value of FF 00 FF FFh (decimal 255 0 255 and 255). Note that all saturated result values are treated as unsigned numbers. In this embodiment, the destination is written during pipeline phase E1 and the SPACKU4 instruction is categorized has having no delay slots.

Figure 7A:
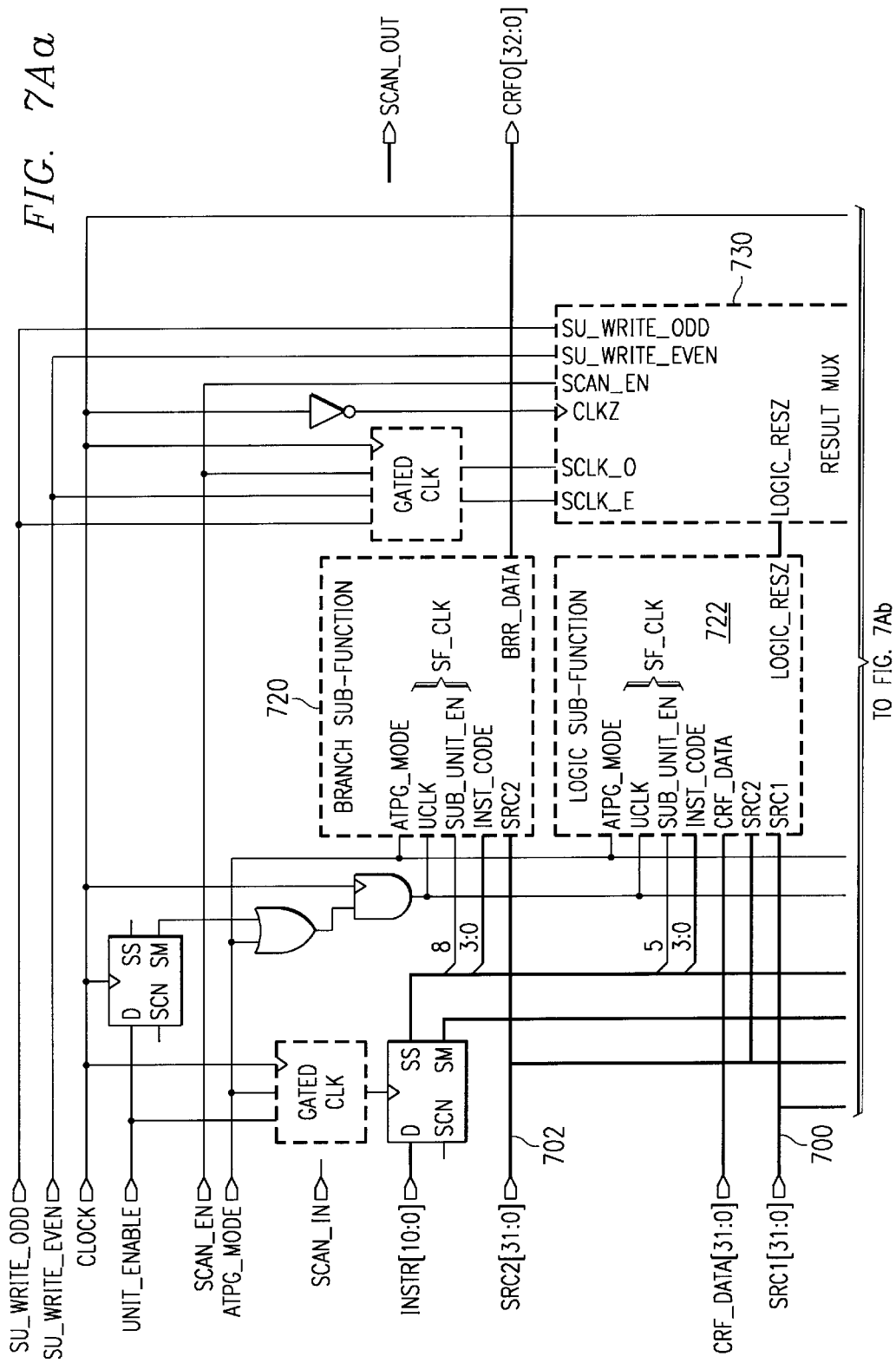
FIGS. 7Aa–7Ab are block diagrams illustrating a multi-field saturation circuit for performing SPACK2/SPACKU4 instructions within an .S functional unit.
Figure 7A:
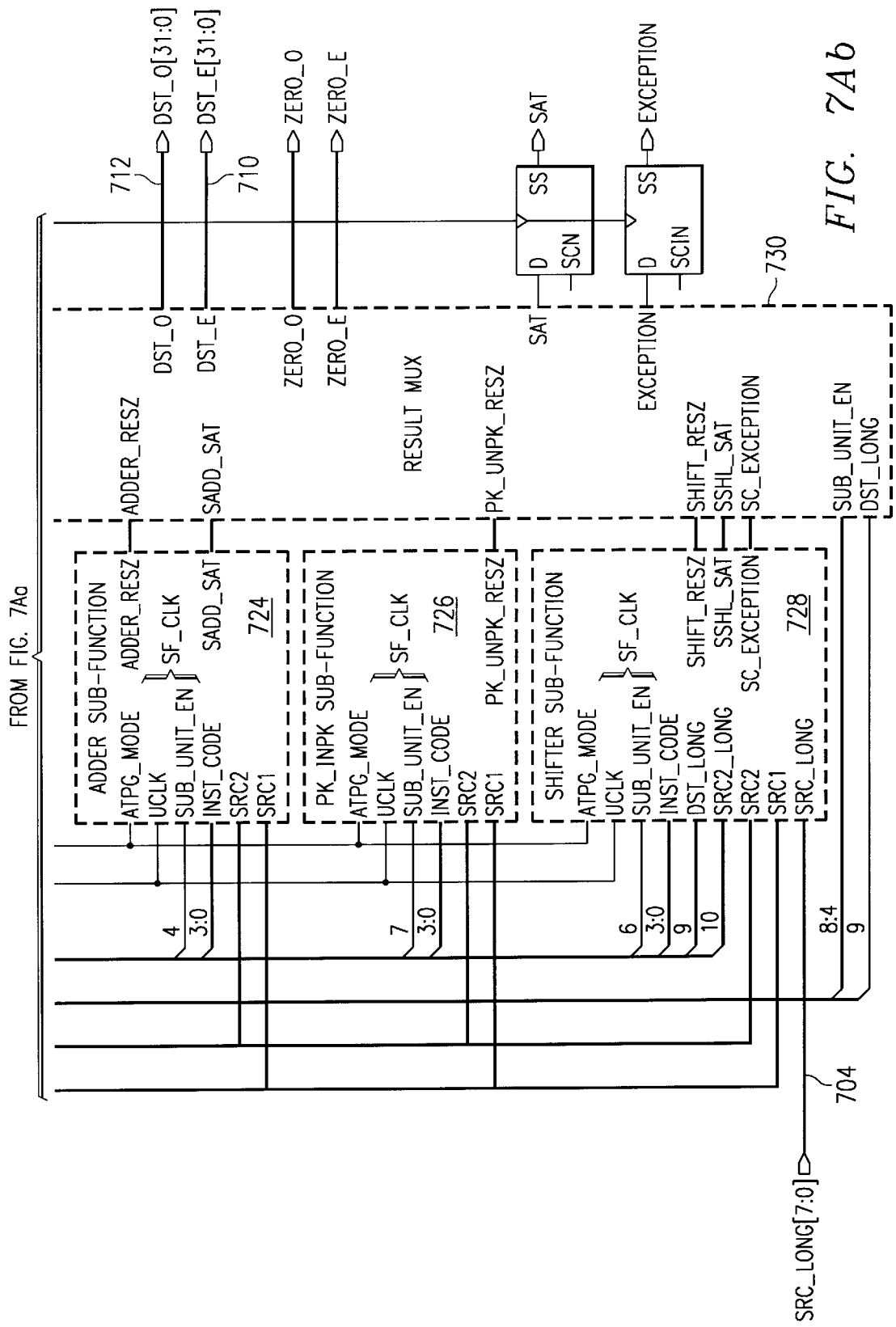

FIGS. 7Aa–7Ab are top level block diagrams of .S unit 16a, which is optimized to handle arithmetic, logical, and shifting and also for the multi-field saturation instructions of the present invention. The .S unit receives source operand one on inputs 700 and source operand two on inputs 702. An additional 8-bit source input is received on inputs 704 for long source operands. A destination operand output is provided output 710, while a long portion of a destination operand is provided on outputs 712. The .S unit has five major functional units: branch circuitry 720, logical function circuitry 722, adder functional circuitry 724, pack/unpack functional circuitry 726, and shifter circuitry 728.

The lower 32 bits (bits 31:0) of a result are selected by results multiplexer 730 and are stored in the even register of a register pair via outputs 710. The upper 8 bits (bits 39:33) of a long result are selected by multiplexer 730 and are stored in the odd register of the register pair via outputs 712.

Multi-field pack/unpack circuitry 728 performs multi-field packing and unpacking operations as well as multi-field saturation. Multi-field circuitry 228 also performs shifting of signed and unsigned packed data. Table 10 describes a set of instructions that are all executed by multi-field pack/unpack circuitry 728. Multi-field packing and unpacking can also be performed in .L functional units 18a, 18b and is described in detail in coassigned U.S. patent application Ser. No. 09/702, 405 Microprocessor Having a Set of Byte Intermingling Instructions and is incorporated herein by reference.

TABLE 10

Multi-field Instruction Set Description

| | |
|---|---|
| PACK2 | Pack 16lsb, 16lsb into Packed 16-bit: The PACK2 instruction takes the lower half-words from src1 and src2 and packs them both into dst. The lower half-word of src1 is placed in the upper half-word of dst. The lower half-word of src2 is placed in the lower half-word of dst. This instruction is useful for manipulating and preparing pairs of 16-bit values to be used by the packed arithmetic operations, such as ADD2. |
| PACKH2 | Pack 16msb, 16msb into Packed 16-bit: The PACKH2 instruction takes the upper half-words from src1 and src2 and packs them both into dst. The upper half-word of src1 is placed in the upper half-word of dst. The upper half-word of src2 is placed in the lower half-word of dst. This instruction is useful for manipulating and preparing pairs of 16-bit values to be used by the packed arithmetic operations, such as ADD2. |
| PACKHL2 | Pack 16msb, 16lsb into Packed 16-bit: The PACKHL2 instruction takes the upper half-word from src1 and the lower half-word from src2 and packs them both into dst. The upper half-word of src1 is placed in the upper half-word of dst. The lower half-word of src2 is placed in the lower half-word of dst. This instruction is useful for manipulating and preparing pairs of 16-bit values to be used by the packed arithmetic operations, such as ADD2. |
| PACKLH2 | Pack 16lsb, 16msb into Packed 16-bit: The PACKLH2 instruction takes the lower half-word from src1 and the upper half-word from src2 and packs them both into dst. The lower half-word of src1 is placed in the upper half-word of dst. The upper half-word of src2 is placed in the lower half-word of dst. This instruction is useful for manipulating and preparing pairs of 16-bit values to be used by the packed arithmetic operations, such as ADD2. |
| SHLMB | Shift Left and Merge Byte: The SHLMB instruction shifts the contents of src2 left by one byte, and then the most |

TABLE 10-continued

Multi-field Instruction Set Description

| | |
|---|---|
| | significant byte of src1 is merged into the least significant byte position. The result is then placed in dst. |
| SHR2 | Shift Right, Signed Packed 16-bit: The SHR2 instruction performs an arithmetic shift right on signed packed 16-bit quantities. The values in src2 are treated as signed packed 16-bit quantities. The lower five bits of src1 or ucst5 are treated as the shift amount. The results are placed in a signed packed 16-bit format into dst. For each signed 16-bit quantity in src2, the quantity is shifted right by the number of bits specified in the lower five bits of src1 or ucst5. Bits 5 through 31 of src1 are ignored and may be non-zero. The shifted quantity is sign-extended, and placed in the corresponding position in dst. Bits shifted out of the least-significant bit of the signed 16-bit quantity are discarded. |
| SHRU2 | Shift Right, Unsigned Packed 16-bit: The SHRU2 instruction performs an arithmetic shift right on unsigned packed 16-bit quantities. The values in src2 are treated as unsigned packed 16-bit quantities. The lower five bits of src1 or ucst5 are treated as the shift amount. The results are placed in an unsigned packed 16-bit format into dst. For each unsigned 16-bit quantity in src2, the quantity is shifted right by the number of bits specified in the lower five bits of src1 or ucst5. Bits 5 through 31 of src1 are ignored and may be non-zero. The shifted quantity is zero-extended, and placed in the corresponding position in dst. Bits shifted out of the least-significant bit of the signed 16-bit quantity are discarded. |
| SHRMB | Shift Right and Merge Byte: The SHRMB instruction shifts the contents of src2 right by one byte, and then the least significant byte of src1 is merged into the most significant byte position. The result is then placed in dst. |
| SWAP2 | Swap Half-words in Each Word (Pseudo-Operation): The SWAP2 is a pseudo-operation that takes the lower half-word from src2 and places it in the upper half-word of dst while the upper-half word from src2 is placed in the lower half-word of dst. It assembles as PACKLH2 src, src, dst. This instruction is useful for manipulating and preparing pairs of 16-bit values to be used by the packed arithmetic operations, such as ADD2. The SWAP2 instruction can be used in conjunction withe SWAP4 instruction to change the byte ordering (and therefore, the endianness) of 32-bit data. |
| UNPKHU4 | Unpack High Unsigned Packed 8-bit to Unsigned Packed 16-bit: The UNPKHU4 instruction moves the two most significant bytes of src2 into the two low bytes of the two half-words of dst. Specifically, the uper byte in the upper half-word is placed in the lower byte in the upper halfword while the lower byte of the upper half-word is placed in the lower byte of the lower half-word. The src2 bytes are zero-extended when unpacked, filling the two high bytes of the two half-words of dst with zeros. |
| UNPKLU4 | Unpack Low Unsigned Packed 8-bit to Unsigned Packed 16-bit: The UNPKLU4 instruction moves the two least significant bytes of src2 into the two low bytes of the two half-words of dst. Specifically, the upper byte in the lower half-word is placed in the lower byte in the upper halfword while the lower byte of the lower half-word is kept in the lower byte of the lower half-word. The src2 bytes are zero-extended when unpacked, filling the two high bytes of the two half-words of dst with zeros. |

Figure 7B:
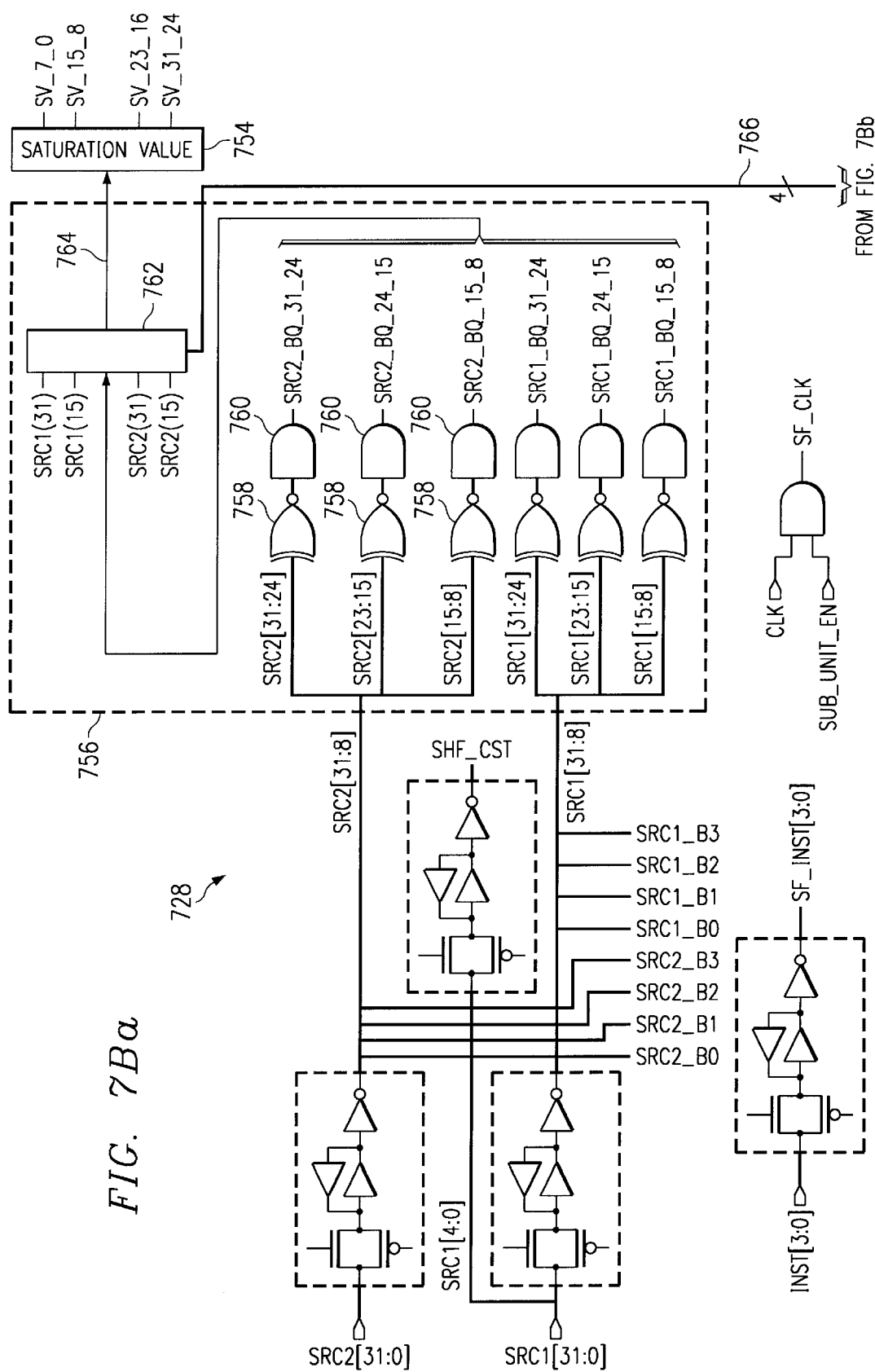
FIGS. 7Ba–7Bb are more detailed block diagrams of the saturation circuit of FIGS. 7Aa–7Ab.
Figure 7B:
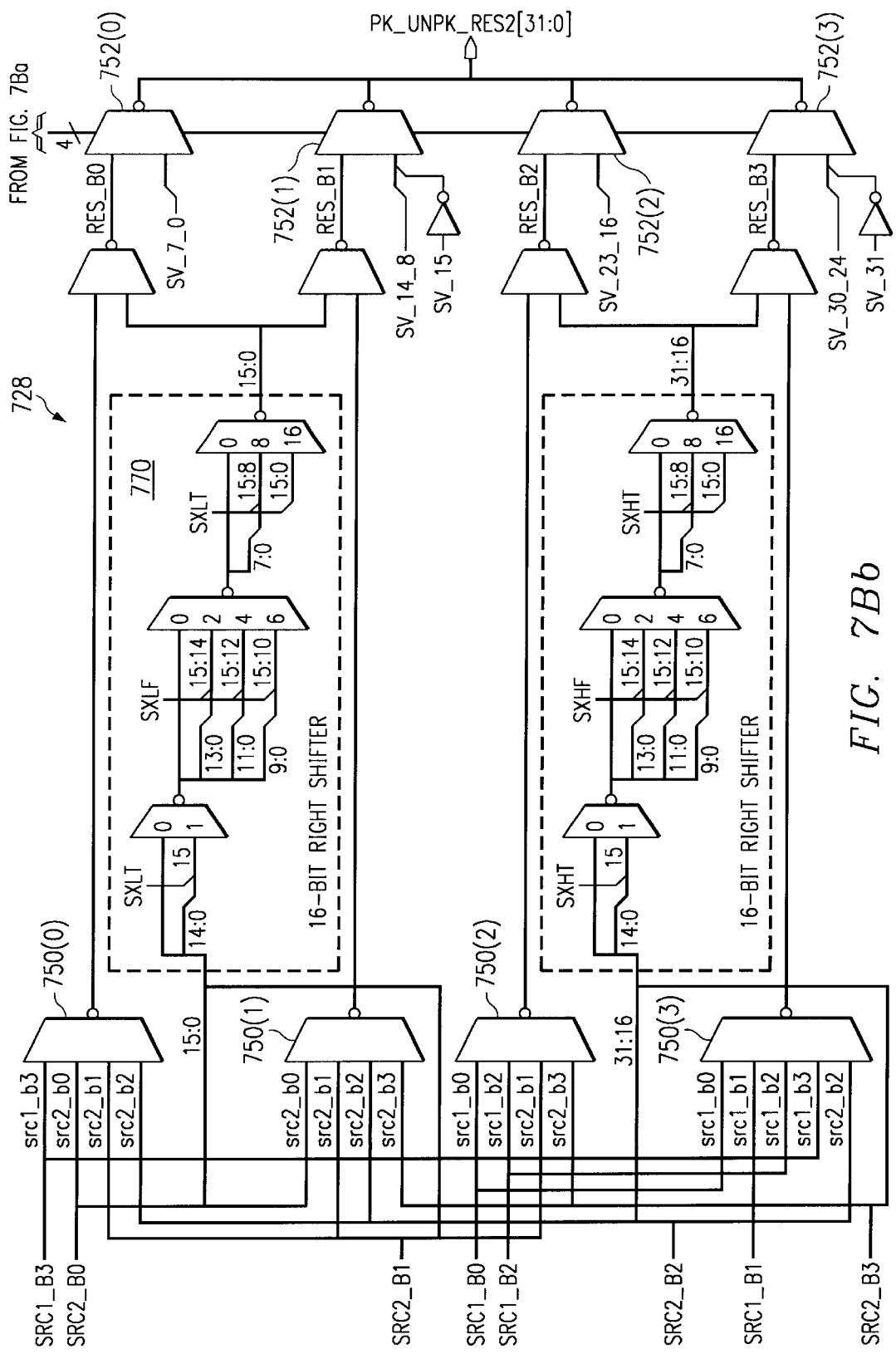

FIGS. 7Ba–7Bb are more detailed block diagrams of multi-field pack/unpack circuitry 728 of FIG. 7A. When executing a SPACK2 instruction, pack circuitry 728 is partitioned into two sections to form a destination operand with two 16-bit packed saturated results. When executing a SPACKU4 instruction, pack circuitry 728 is partitioned into four sections to form a destination operand with four 8-bit packed saturated results. Each of the packing circuit partitions has a field selection circuit 750(0–3) connected to receive a least significant portion (lsp) of respective fields from the first and second source operands in accordance with whether a two field or four field saturating pack instruction is being executed. The field selection circuitry operable to select and output one of the lsp source operand fields to result selection circuitry 752(0–3). The result selection circuitry is connected to receive the selected lsp source operand field from the field selection circuitry and a saturation value from saturation value circuitry 754. Each two input multiplexor is operable to output the lsp source operand field or the saturation value as the saturated result in response to control signals from saturation detection circuitry 756.

Saturation detection circuitry 756 is connected to receive a truncated portion of each of the four fields 622(1), 622(3), 620(0) and 620(3) for a four field operation. For a two field operation, saturation detection circuitry receives a truncated portion of each of the two fields 602(1) and 600(1). By determining bit equality using gates 758, 760 and msbs src2(31, 15) and src1(31, 15) in control circuitry 762, the detection circuitry indicates if the truncated portion of each of the fields has a value of nominal, excess positive or excess negative on indicator signals 764.

Saturation value circuitry 754 forms a saturation value of either positive saturation or negative saturation in either two field or four field format in response to indicator signals 764. Control signals 766 generated by saturation detection circuitry 756 control each two input multiplexer 752(0–3) individually to select either the nominal truncated operand field or the saturation value to form either a two field saturated result or a four field saturated result.

Thus, the pack circuit partitions form a set of saturated values corresponding to a selected number of fields from a selected pair of source operands that are then written into respective field positions of a selected destination register during instruction pipeline E1 in response to a single SPACK2 or SPACKU4 instruction.

One skilled in the art will recognize that packing circuitry 728 may be implemented in a number of different ways, by using various configurations of full multiplexers, shifters, and such. In another embodiment, the saturation circuitry may be implemented such that a multi-field saturation instruction executes with a different number of delay slots, such as one or two, for example. In another embodiment, a multi-field saturated result with bit fields having a different width may be formed, such as four for example. There may be other than two varieties of saturation instructions wherein different opcodes or a parameter is used to identify various bit field widths, for example. In this embodiment of the present invention, saturation circuitry is included in the S units of the CPU. However, in another embodiment, saturation circuitry may be included in other or different functional units. In this embodiment, shift circuitry 770 is included within pack circuitry 728; however, this is only a matter of design choice and may be located elsewhere in another embodiment. In another embodiment, saturation circuitry may be separate and not associated with shift circuitry, for example.

Figure 8:
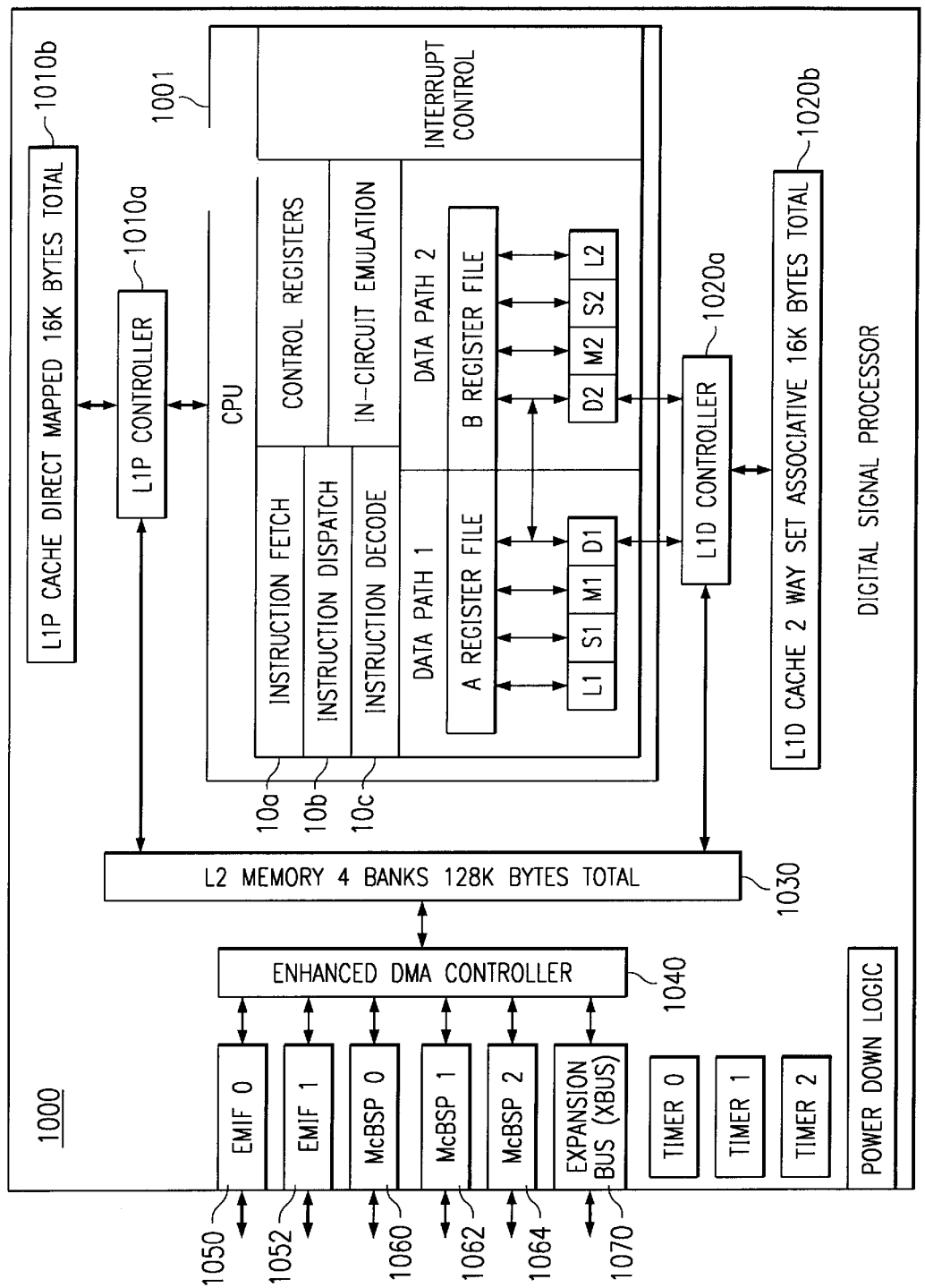
FIG. 8 is a block diagram of an alternative embodiment of the processor of FIG. 1.

FIG. 8 is a block diagram of an alternative embodiment of the present invention in a digital system 1000 with processor core 10 of FIG. 1. A direct mapped program cache 1010, having 16 Kbytes capacity, is controlled by L1 Program (L1P) controller 1011 and connected thereby to the instruction fetch stage 10a. A 2-way set associative data cache, having a 16 Kbyte capacity, is controlled by L1 Data (L1D) controller 1721 and connected thereby to data units D1 and D2. An L2 memory 1030 having four banks of memory, 128 Kbytes total, is connected to L1P 1011 and to L1D 1021 to provide storage for data and programs. External memory interface (EMIF) 1050 provides a 64 bit data path to external memory, not shown, which provides memory data to L2 memory 1030 via extended direct memory access (DMA) controller 1040.

EMIF 1052 provides a 16-bit: interface for access to external peripherals, not shown. Expansion bus 1070 provides host and I/O support similarly to host port 60/80 of FIG. 1.

Three multi-channel buffered serial ports (McBSP) 1060, 1062, 1064 are connected to DMA controller. 1040.

Figure 9:
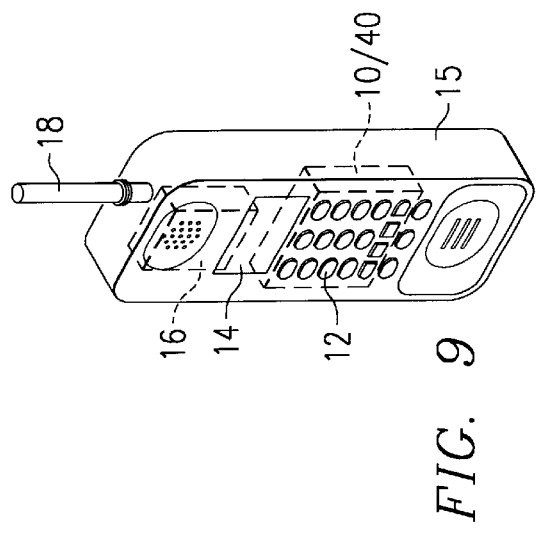
FIG. 9 illustrates an exemplary implementation of a digital system that includes an embodiment of the present invention in a mobile telecommunications device.

FIG. 9 illustrates an exemplary implementation of a digital system that includes DSP 1 packaged in an integrated circuit 40 in a mobile telecommunications device, such as a wireless telephone 15. Wireless telephone 15 has integrated keyboard 12 and display 14. As shown in FIG. 9, DSP 1 is connected to the keyboard 12, where appropriate via a keyboard adapter (not shown), to the display 14, where appropriate via a display adapter (not shown) and to radio frequency (RF) circuitry 16. The RF circuitry 16 is connected to an aerial 18. Advantageously, by providing a set of multi-field saturation instructions, complex signal processing algorithms can be written in a more efficient manner to satisfy the demand for enhanced wireless telephony functionality.

Fabrication of digital system 10 involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual dice which may be sold as bare die or packaged. After packaging, finished parts are biased into an operational state and tested for operational functionality.

Thus, a digital system is provided with a processor having an improved instruction set architecture. The processor is code-compatible with C62xx DSP processors from Texas Instruments Incorporated. It provides a superset of the C62x architecture while providing complete code compatibility for existing C62x code. The processor provides extensions to the existing C62x architecture in several areas: register file enhancements, data path extensions, additional functional unit hardware, increased orthogonality of the instruction set, data flow enhancements, 8-bit and 16-bit extensions, and additional instructions that reduce code size and increase register flexibility.

Advantageously, a set of multi-field saturation instructions is provided that provide features of single instruction, multiple data (SIMD) operation. Code size is thereby reduced and performance improved.

As used herein, the terms "applied," "connected," and "connection" mean electrically connected, including where additional elements may be in the electrical connection path. "Associated" means a controlling relationship, such as a memory resource that is controlled by an associated port. The terms assert, assertion, de-assert, de-assertion, negate and negation are used to avoid confusion when dealing with a mixture of active high and active low signals. Assert and assertion are used to indicate that a signal is rendered active, or logically true. De-assert, de-assertion, negate, and negation are used to indicate that a signal is rendered inactive, or logically false.

While the invention has been described with reference to illustrative embodiments, this description is not intended to be construed in a limiting sense. Various other embodiments of the invention will be apparent to persons skilled in the art upon reference to this description. In another embodiment, the source operands may be provided in response to a memory fetch instead of being read from the register file. A multi-field saturating instruction may be executed in another functional unit instead of or in addition to the .S functional units. In another embodiment, a different number of fields, such as eight, for example, could be saturated separately. Different opcodes could define the number of fields, or a parameter could define the number of fields, for example.

In another embodiment, values in each field could be treated as something other than an integer value, such as a floating point value, for example.

It is therefore contemplated that the appended claims will cover any such modifications of the embodiments as fall within the true scope and spirit of the invention.

What is claimed is:

1. A digital system comprising a microprocessor having an instruction execution pipeline with a plurality of pipeline phases, wherein the microprocessor comprises:

program fetch circuitry operable to perform a first portion of the plurality of pipeline phases;

instruction decode circuitry connected to receive fetched instructions from the program fetch circuitry, the instruction decode circuitry operable to perform a second portion of the plurality of pipeline phases; and at least a first functional unit connected to receive control signals from the instruction decode circuitry, the functional unit operable to perform a third portion of the plurality of pipeline phases, the third portion being execution phases, wherein the first functional unit comprises:

partitionable multi-field packing circuitry connected to receive a plurality of source operands and having outputs connected to provide a multi-field saturated result as a destination operand in response to control signals from the instruction decode circuitry, wherein the multi-field packing circuitry is operable to treat the plurality of source operands as a set of N1 fields, such that the multi-field saturated result includes N1 saturated results corresponding to the set of N1 fields; and wherein the first functional unit is operable to provide the multi-field saturated result in response to a single instruction of a first type, wherein N1 is two in response to a first instruction of the first the and wherein N1 is four in response to a second instruction of the first type.

2. The digital system of claim 1, wherein the multi-field packing circuitry is operable to receive the plurality of source operands and to provide the multi-field saturated result during a single pipeline execution phase.

3. The digital system of claim 1, wherein the plurality of source operands consists of a first source operand and a second source operand and wherein the N1 number of fields is four, such that the multi-field saturated result includes four saturated results.

4. The digital system of claim 1, wherein the multi-field packing circuitry is partitionable into N1 packing circuits in response to each instruction of the first type.

5. The digital system of claim 4, wherein the multi-field packing circuitry comprises:

saturation detection circuitry connected to receive a truncated portion of each of the N1 fields, wherein the detection circuitry is operable to indicate if the truncated portion of each of the N1 fields has a value of nominal, excess positive or excess negative;

saturation value circuitry having saturation value outputs, operable to output a positive saturation value or a negative saturation value in response to the excess positive or excess negative indication from the detection circuitry; and wherein each of the N1 packing circuit partitions comprises:

field selection circuitry connected to receive a least significant portion (lsp) of respective fields from the plurality of source operands in accordance with N1, the field selection circuitry operable to select and output one of the lsp source operand fields, result selection circuitry connected to receive the selected lsp source operand field from the field selection circuitry and a saturation value from the saturation value circuitry, operable to output the lsp source operand field or the saturation value as the saturated result in response to the indicators from the detection circuitry.

6. The digital system of claim 5, wherein each packing circuit partition is operable to selectively treat a field as either a signed value or an unsigned value.

7. The digital system of claim 1, further comprising a register file connected to the first functional unit for providing the plurality of source operands and connected to the first functional unit to receive the destination operand.

8. The digital system of claim 1, wherein the instruction of the first type has a field for identifying a predicate register.

9. The digital system of claim 1 being a cellular telephone, further comprising:

an integrated keyboard connected to the CPU via a keyboard adapter;

a display, connected to the CPU via a display adapter;

radio frequency (RF) circuitry connected to the CPU; and an aerial connected to the RF circuitry.

10. A method of operating a digital system having a microprocessor with multi-field saturation instructions, comprising the steps of:

fetching a multi-field saturation instruction for execution;

fetching a plurality of source operands selected by the multi-field saturation instruction;

treating the plurality of source operands as a set of N1 fields, wherein N1 is two in response to a first multi-field saturation instruction of a first type and wherein N1 is four in response to a second multi-field saturation instruction of the first type, wherein said first multi-field saturation instruction is different from said second multi-field saturation instruction;

determining a saturated result of a each of the set of N1 fields to form N1 saturated results; and writing a destination operand with the N1 saturated results.

11. The method of claim 10, wherein the step of determining is performed during a single execution phase of the microprocessor.

* * * * *